United States Patent
Martineau

(10) Patent No.: US 9,304,764 B2
(45) Date of Patent: Apr. 5, 2016

(54) AUTOMATED MERGING IN A SOFTWARE DEVELOPMENT ENVIRONMENT

(75) Inventor: David John Martineau, Stouffville (CA)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 13/617,863

(22) Filed: Sep. 14, 2012

(65) Prior Publication Data

US 2013/0014083 A1    Jan. 10, 2013

Related U.S. Application Data

(63) Continuation of application No. 12/033,609, filed on Feb. 19, 2008, now abandoned.

(51) Int. Cl.
*G06F 9/44* (2006.01)

(52) U.S. Cl.
CPC .................................. *G06F 8/71* (2013.01)

(58) Field of Classification Search
CPC .......................................................... G06F 8/71
USPC .......................................................... 717/122
See application file for complete search history.

(56) References Cited

U.S. PATENT DOCUMENTS

| | | | |
|---|---|---|---|
| 5,481,722 A | 1/1996 | Skinner | |
| 6,560,721 B1 * | 5/2003 | Boardman et al. | 714/33 |
| 6,601,017 B1 * | 7/2003 | Kennedy et al. | 702/182 |
| 6,601,233 B1 | 7/2003 | Underwood | |
| 6,626,953 B2 * | 9/2003 | Johndrew et al. | 715/234 |
| 6,681,382 B1 | 1/2004 | Kakumani et al. | |
| 6,766,334 B1 * | 7/2004 | Kaler et al. | 1/1 |
| 7,152,224 B1 | 12/2006 | Kaler et al. | |
| 7,251,669 B1 * | 7/2007 | Arora | 707/695 |
| 7,266,805 B2 * | 9/2007 | Weidman et al. | 717/101 |
| 7,337,124 B2 | 2/2008 | Corral | |
| 7,603,393 B1 * | 10/2009 | Cote et al. | 1/1 |
| 7,739,653 B2 | 6/2010 | Venolia | |
| 8,370,803 B1 | 2/2013 | Holler et al. | |
| 8,522,207 B1 | 8/2013 | Whittington et al. | |
| 2003/0066049 A1 | 4/2003 | Atwood et al. | |
| 2004/0205727 A1 | 10/2004 | Sit et al. | |
| 2005/0278715 A1 * | 12/2005 | Herle et al. | 717/162 |

(Continued)

OTHER PUBLICATIONS

Sink, Eric. "Business Software: Source control how to [on line]", Source Gear, Chapter 3 (5 pages), Aug. 26, 2004.
IBM Rational Clear Case and Clear Case LT, Version 7.0.0, Introduction, 7th Edition, May 2006, 64 pages.
Office Action in U.S. Appl. No. 12/033,651 dated Aug. 4, 2011.

(Continued)

*Primary Examiner* — Wei Zhen
*Assistant Examiner* — Lanny Ung
(74) *Attorney, Agent, or Firm* — Sughrue Mion, PLLC

(57) ABSTRACT

A system and method for selectively operating on changed elements, for example merging, in a software development environment are provided. A software project comprising one or more version-controlled software development objects, or elements, is associated with one or more defects recording changed elements in the software development environment. The system and method provide for automated merging of changed elements associated with defects tagged for forward merging into the software project, and association or tracking actions for changed elements associated with defects that are tagged as not to be merged. The process of automated merging is carried out using a master work list listing work items representing changed elements ordered chronologically.

26 Claims, 6 Drawing Sheets

(56) References Cited

U.S. PATENT DOCUMENTS

| | | |
|---|---|---|
| 2006/0123389 A1 | 6/2006 | Kolawa et al. |
| 2006/0136510 A1* | 6/2006 | Voronov et al. ............... 707/203 |
| 2007/0011649 A1 | 1/2007 | Venolia |
| 2007/0074149 A1 | 3/2007 | Ognev et al. |
| 2009/0210857 A1 | 8/2009 | Martineau |
| 2010/0211924 A1 | 8/2010 | Begel et al. |

OTHER PUBLICATIONS

Office Action in U.S. Appl. No. 12/033,651 dated Jan. 3, 2012.
Office Action in U.S. Appl. No. 12/033,651 dated May 7, 2012.
Office Action in U.S. Appl. No. 12/033,651 dated Dec. 19, 2012.
Office Action in U.S. Appl. No. 13/947,917 dated Jun. 3, 2015.
Office Action in U.S. Appl. No. 13/947,917 dated Oct. 6, 2015.
Michael et al; "Using Origin Analysis to Detect Merging and Splitting of Source Code Entities"; Aug. 2005; 15 pages.

* cited by examiner

AUTOMATED MERGING IN A SOFTWARE DEVELOPMENT ENVIRONMENT

CROSS-REFERENCE TO RELATED PATENT APPLICATIONS

The present application is a continuation of U.S. patent application Ser. No. 12/033,609, filed Feb. 19, 2008. The disclosures of the prior applications are hereby incorporated in their entireties by reference.

TECHNICAL FIELD

This invention relates generally to managing changed elements in a software development environment, and in particular to automated systems for merging changed elements in a project within a software development environment.

DESCRIPTION OF THE RELATED ART

Software configuration management (SCM) systems allow users to manage multiple variants of the various objects or elements of software systems, and in particular may be configured to allow development teams to work in parallel in writing, modifying, porting, and upgrading software system elements while providing management or auditing tools for monitoring the changes made to the elements, and building software products from a plurality of elements. For example, the SCM may provide a check-out-edit-check-in model, in which an individual programmer may "check out" an element from a data repository, creating a local editable copy of the element, edit the element, then "check in" the element again in order to integrate the changes made with the data repository. The newly-changed element is stored as a new version of the element, and auditing features of the SCM may record information regarding the changes made. The SCM system may provide for the merging of a changed software element with other versions of the same base element to produce a new version of the element, sometimes referred to as "forward fitting", as well as means to record information about the merge for future reference. The foregoing features may be provided in a single SCM product, or alternatively may be provided by software products that separately provide for configuration management and tracking defects and changes made to the elements stored in the data repository.

Each time a change to an element is made, it may be individually and manually merged into a new version of the element by the programmer who made the change. However, the scope of software development may encompass a number of programmers, hundreds or thousands of software elements, and hundreds or thousands of changes to elements; it is therefore undesirable to require that each and every change be manually merged. While the SCM system may provide for automated merging of all outstanding changes made to an element, a single element may be used in a number of different concurrent software projects; changes made to one version of an element for a first software project may not be required for a second software project.

It is therefore desirable to provide a system and method in which changes to an element may be selectively merged forward. It is further desirable to provide a system and method in which the merging of source code element changes is automated. It is also desirable to provide these features in a SCM system or other software development environment for managing multiple software projects sharing elements.

SUMMARY OF THE INVENTION

In accordance with a preferred embodiment, a method for selectively operating on changed elements in a software development environment is provided, the software development environment comprising a set of at least one defect associated with a software project, the software project comprising a plurality of version-controlled software development objects, each defect being associated with at least one changed element, each changed element comprising a modified version-controlled software development object, wherein the method comprises generating, for each of the changed elements in the software project, a work item comprising an identifier of the changed element, an operation for the changed element, and a target for said operation; generating a master work list comprising the said work items chronologically ordered; and for each unique version-controlled software development object associated with the changed elements of each work item in the master work list, executing all work items associated with the unique element in chronological order.

A further embodiment provides a computer program product comprising a computer usable medium embodying a computer readable program, wherein the computer readable program when executed on a computer providing a software development environment comprising a set of at least one defect associated with a software project wherein the software project comprises a plurality of version-controlled software development objects, each defect being associated with at least one changed element, and each changed element comprising a modified version-controlled software development object, causes the computer to generate, for each of the changed elements in the software project, a work item comprising an identifier of the changed element, an operation for the changed element, and a target for said operation; generate a master work list comprising the said work items chronologically ordered; and for each unique version-controlled software development object associated with the changed elements of each work item in the master work list, execute all work items associated with the unique element in chronological order.

Still a further embodiment provides a system for selectively operating on changed elements, comprising a data repository for storing version-controlled software development objects associated with a software project, and for storing at least one changed element comprising a modified version-controlled software development object; and a software development environment interoperable with the data repository for recording defects associated with a software project, for tracking changed elements, and for merging changed elements with a corresponding version-controlled software development object, wherein the software development environment is configured to generate, for each of the changed elements in the software project, a work item comprising an identifier of the changed element, an operation for the changed element, and a target for said operation; generate a master work list comprising the said work items chronologically ordered; and for each unique version-controlled software development object associated with the changed elements of each work item in the master work list, execute all work items associated with the unique element in chronological order, wherein the operation for each of the changed elements is selected from merging the changed element at the target and associating the changed element with the target, the target comprising a target version-controlled software development object.

BRIEF DESCRIPTION OF THE DRAWINGS

In drawings which illustrate by way of example only a preferred embodiment of the invention.

DETAILED DESCRIPTION

The following embodiments are described in the context of a software development environment (SDE), which may be provided in, or as part of, a software configuration management system (SCM), or in conjunction with other software management tools for tracking, managing, or auditing projects created and edited in the SDE. In a first embodiment, a data repository is provided. The data repository may be secure or permanent, and may by globally accessed at a central repository. The data repository may alternatively be provided in a distributed environment. The implementation of such a data repository will be understood by those skilled in the art.

The SDE may operate as a configuration management product, providing for version control of various files and projects stored in the data repository. A single software project may comprise a plurality of software development objects of different types, such as text files, graphics, directories, hyperlinks, and the like. These objects, hereinafter referred to as elements, are stored in the data repository. Changes to the elements may be stored as separate files (i.e., complete copies of the changed elements), or as deltas or weaves, which in a single stored instance of the element records the differences or changes for each version of the element, and the SDE may track changes made to various versions of a given element; thus, the data repository may store a plurality of version-controlled software development objects or elements. Elements may also be stored in compressed file formats. Techniques for the recording of element changes and file compression will be known to those of ordinary skill in the art. The project may further comprise derived objects, such as executable program files compiled from source code material. These derived objects in turn may also be versioned, for example generated for each corresponding version of the element from which the derived object was generated.

Figure 1A:
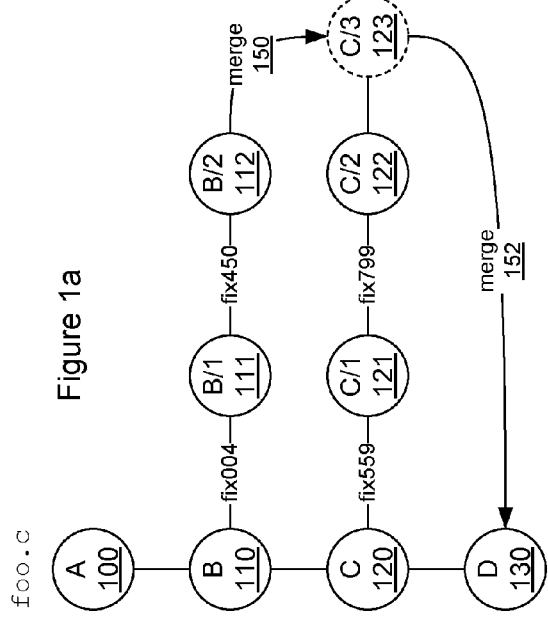
FIGS. 1a and 1b are schematic representations of element version histories in a software development environment.

Referring to FIG. 1a, a schematic representation of an exemplary embodiment of a version-controlled element in the SDE is shown, comprising both subbranches (comprising elements B/1 111 and B/2 112, in a first example, and elements C/1 121 and C/2 122 as a second example) and a main branch (comprising elements A 100, B 110, C 120, and D 130). A given element, here foo.c, is initially created in a first version A 100. This element 100 may be modified to provide a second version of the same element, version B 110; it may be further modified to provide a third version of the same element, version C 120. Modifications of the element 100 may be made for a number of reasons; for example, modifications may be created to address a need to fix a reported bug in the software, or to port a project to a different platform, or to create a customized version of the software for a customer. Regardless of the motivation for creating different versions of the original element A 100, these versions may be developed in parallel. For example, versions B 110 and C 120 may represent versions of foo.c that coexist in released versions of a project incorporating that element. For each of these versions B 100 and C 120, changes may be required to address specific requirements; in FIG. 1a, it can be seen that a first change to version B of foo.c, version B/1 111, was made in response to an identified defect labelled "fix004". A second change to version B, B/2 112, was made to version B/1 111 in response to another identified defect labelled "fix450". In the meantime, two changes were made to version C 120 of the element foo.c, resulting in versions C/1 121 and C/2 122.

The example of FIG. 1a depicts only a simple example of the evolution of a single element foo.c. The development effort in creating and updating a software product may of course incorporate hundreds or thousands of changes to various elements of the product, by a large number of developers; moreover, for a given software product, a project may comprise a large number of elements. It is also possible for a single element to be used in more than one project, but the changes that may be made to a given version of an element may not be required for all projects incorporating that element.

In the exemplary SDE, provision is made for automatically managing changes made to the various elements by merging changes to the elements forward into a new version, by combining the contents of two or more elements into a single new element. Changed elements may be merged from one subbranch to another subbranch, from one subbranch to the main branch, or from a main branch to a subbranch of the element history. In the example of FIG. 1a, when the merging feature of the SDE is invoked, each outstanding change to a given version of an element is forward merged to create a new version of the element. Thus, in FIG. 1a, when the automatic merging feature is invoked, the most recent version of element version B 110, B/2 112, is forward merged with a target element, here the most recent version of element version C 120, which is version C/2 122. The merging action is depicted by the merge arrow 150. The resultant changed version of the element, C/3 123, is generated as a successor to version C/2 122. Further, this newly revised version of the element foo.c, C/3 123, may be merged into a new release version of the element D 130. This further merge is depicted by the merge arrow 152. In the example of FIG. 1a, the merges are accomplished in a chronological order; the change B/2 112, being made to a version of the element foo.c preceding the version C 120, is first merged with the changed version C/2 122 to provide C/3 123 before the new release version, D 130, is generated.

The act of merging may be accomplished automatically by the SDE, for example by means of a script or other function built into the SDE. The merge function may be invoked by a command line interface, through a graphical user interface, or other means, and may also be accomplished manually by the user, if desired. If the SDE provides a graphical user interface to illustrate the relationship among the changes to the elements, such as the graphical representation of FIG. 1a, then the SDE may also be configured to allow the user to insert merge arrows 150, 152 to depict a merge relationship between various element versions, or to otherwise create or insert annotations in the SDE regarding the elements B/2 112, C/2 112, and so forth, to indicate that the changed element has been handled by a forward merge, and no longer represents an outstanding change that must be merged or otherwise addressed. These annotations are useful when the SDE also performs an auditing function or management function that requires tracking of the merge history of each and every changed element, or is configured to perform automatic merges of all outstanding, unmerged changed elements.

Figure 1B:
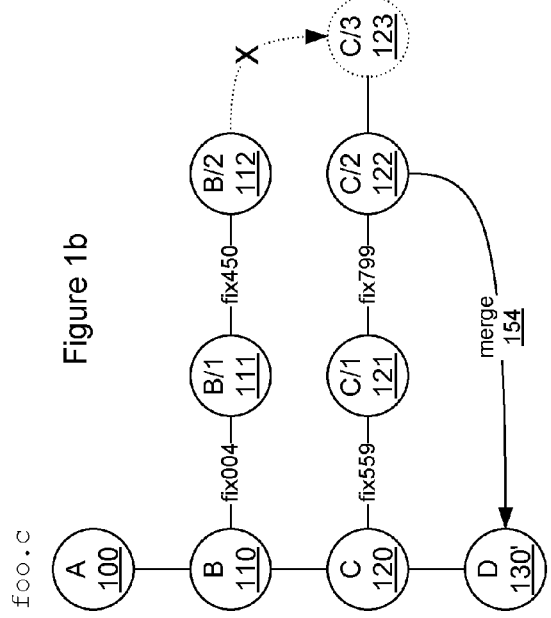

However, in some circumstances it may not be desirable to merge forward all outstanding changes to an element. Turning to FIG. 1b, a second schematic representation of an exemplary embodiment of a version-controlled element in the SDE is shown for the same element, foo.c. The element again begins with a first version A 100, and with similar versions and changes B110, B/1 111, B/2 112, C 120, C/1 121, and C/2 122, but in this example, it is determined that it is not desirable to forward merge the changes made to version B/1 111 (i.e., B/2 112) with the changes made to version C/2 122. However, it remains desirable to incorporate the changes of version C/122 in a new release version D 130'. This merge is depicted in FIG. 1b as the merge arrow 154 between C/2 122 and D 130'.

If the SDE provides for automatic merging of all outstanding changed elements into new versions of the elements, as mentioned above, executing the automated merge function will result in a merging of all changed elements that were not previously annotated as having been merged. This is inconvenient, as the user will then have to manually reverse any merges that were not intended to be executed, thus increasing development time. Alternatively, if a changed element was intended to be merged into a new release of a first project, but not into a new release of a second project in which the element is used, the automated merging of the changed element into the second project may be avoided by creating an independently stored copy of this element; however, this will increase record-keeping overhead in the SDE overall, as the additional elements are created. Further, by creating independent copies of elements for use in other projects, the history of changes to the original element may be lost in the creation of the independent copies, thus requiring the programmer to keep track of multiple stored versions of the same element.

Accordingly, in this embodiment, a method is provided to allow for the automated merging of only selected changed elements. With reference to FIGS. 2 through 11, the SDE provides a system for tracking defects and merging changed elements. A defect may comprise a fault or unexpected behaviour identified in a software product, and here may also refer to a change request or other issue, where it is desirable to make a change to a release of the software product to accommodate a specific requirement. Records of defects may be stored within the SDE or in a data repository to which the SDE has access; these records may also contain information associating the defect with at least one changed element. A single defect or change request may involve changes to multiple elements in a single software project. When a defect (or change request) is entered in the SDE, a record for that defect is created. The records relating to defects may be stored in a database or other suitable record-keeping format, although a relational database format may be preferred. The SDE may provide functionality for the management of defects, including assigning a defect to a programmer or team of programmers, modification of the defect report, and tracking work done to address the identified defect.

Figure 4:
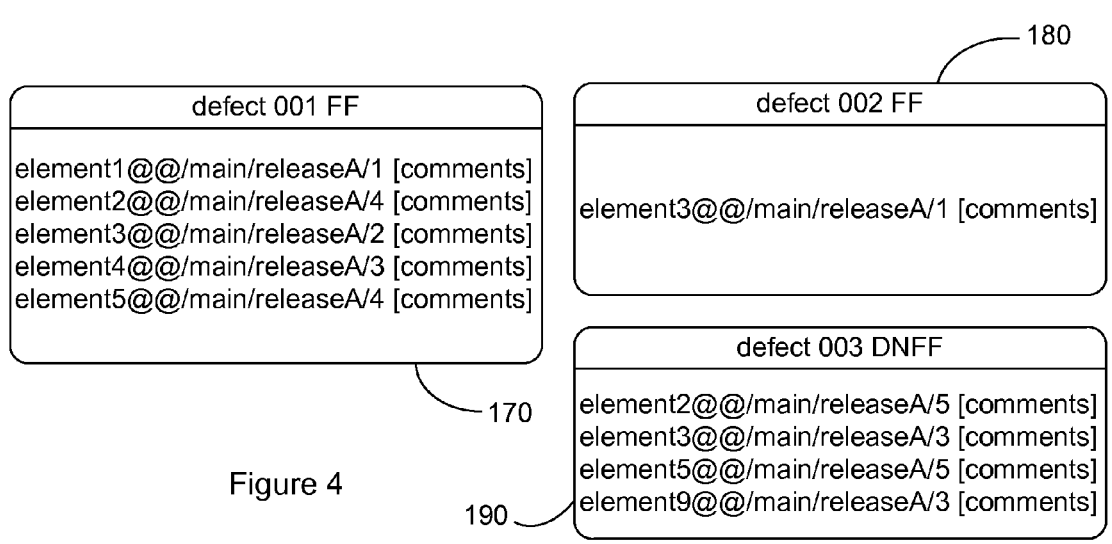
FIG. 4 is a schematic representation of defect records in the software development environment.
Figure 8:
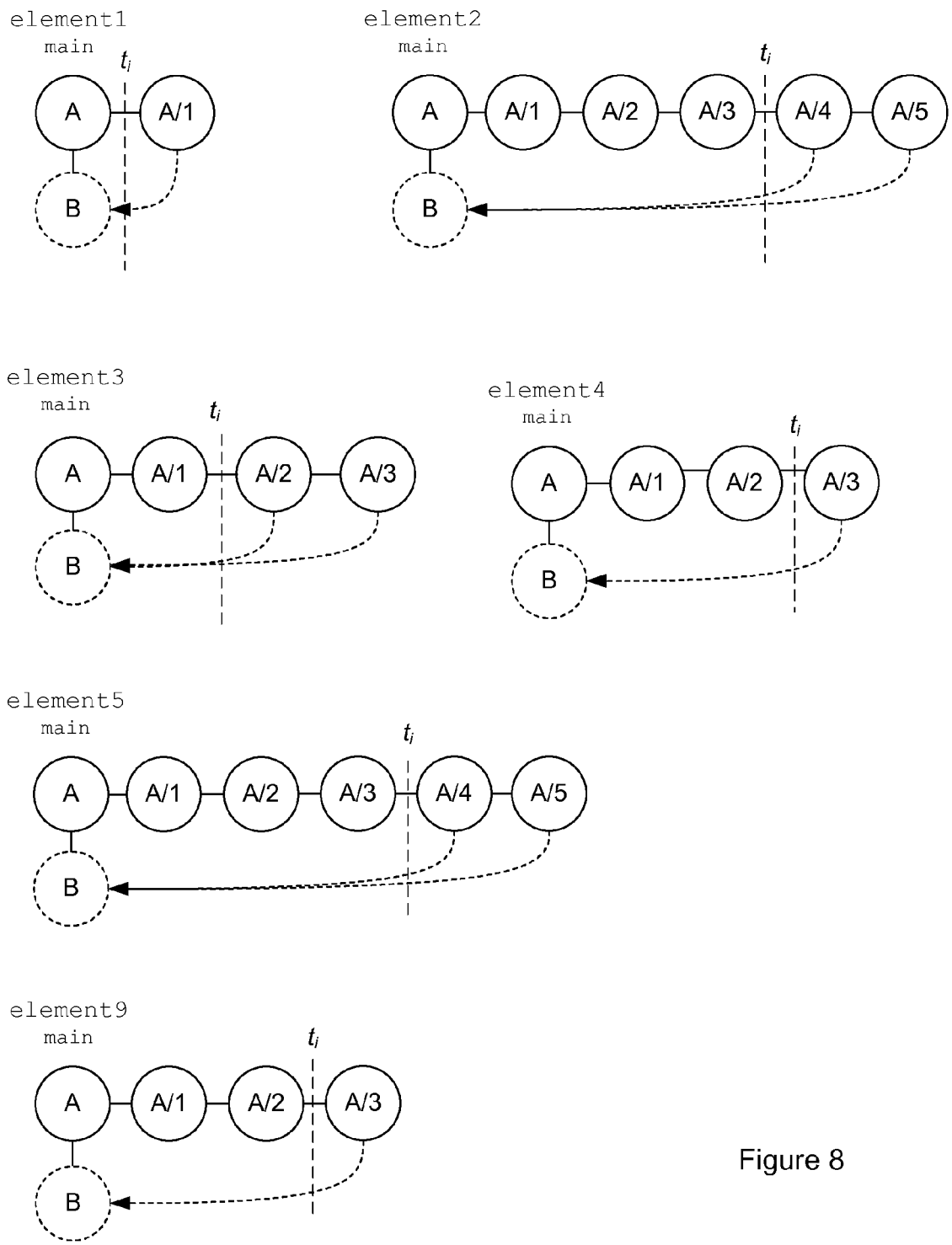
FIG. 8 is a schematic representation of further element version histories in the software development environment.

Examples of partial records of defects are shown in FIG. 4. These schematic representations 170, 180, and 190 illustrate that a single defect (which may be a change request, rather than an identified bug or fault) may comprise changes to a number of elements in a project in the SDE; for example, defect record 170 comprises a record listing five changed elements, here labelled element1@@/main/releaseA/1, element2@@/main/releaseA/4, element3@@/main/releaseA/2, element4@@/main/releaseA/3, and element5@@/main/releaseA/4. The notation used in FIG. 4 is in the format [element name]/[main]/[release version]/[change number]; thus, for example, element2@@/main/releaseA/4 denotes that an element called "element2" has been modified to a release A version in the main branch of element2's version history, and that this release A version has been modified at least four times. The defect record may further comprise comments or other annotations, such as the programmer's notes regarding the nature of the changes made to the corresponding elements. Exemplary schematic representations of some of the elements listed in FIG. 4 are shown in FIG. 8. It will be appreciated that the schematic representation of the element versions also reflects a chronological history of the element; for example, in element2, the change element2@@/main/releaseA/5 would have been made after the creation of element2@@/main/releaseA/4. The line connecting element2@@/main/releaseA/4 and element2@@/main/releaseA/5 illustrates the relationship between these two versions of element2, i.e. that element2@@/main/releaseA/5 was derived from element2@@/main/releaseA/4. In the embodiment illustrated in FIG. 4 and described below, the defects and changed elements may relate to a single release of a software product (e.g., release A) for incorporation into a subsequent release or subrelease. The systems and methods described herein, however, may be adapted to track elements and changed elements across multiple releases and subreleases.

Returning to FIG. 4, defects are further tagged in the SDE as being designated for incorporation or forward merging into a new release or version (also referred to as "forward fitting"), or as not intended for incorporation (merging) into a new release. For example, the schematic representations of the defects 170, 180, and 190 include the tags "FF" and "DNFF", for "forward fit" and "do not forward fit", respectively. Defect records 170 and 180 are marked for forward merging; defect record 190 is not. This tagging or marking is preferably done by the programmer or team working on the defect and making the changes to the identified elements.

Figure 2:
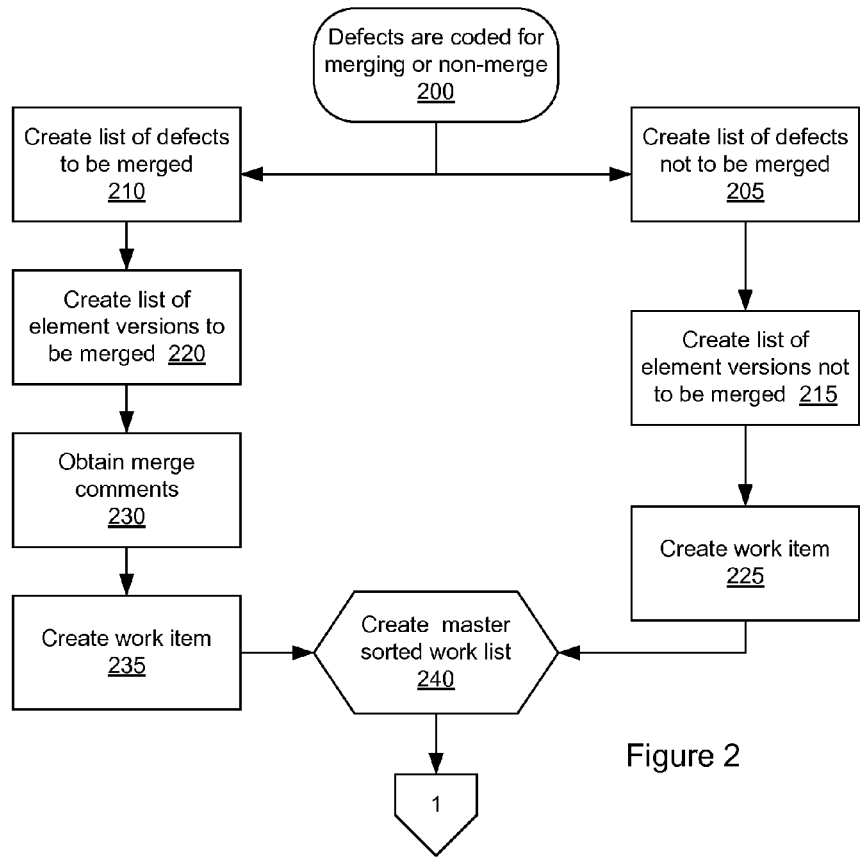
FIG. 2 is a flowchart of a method for automated merging of changed elements in the software development environment.
Figures 3, 9:
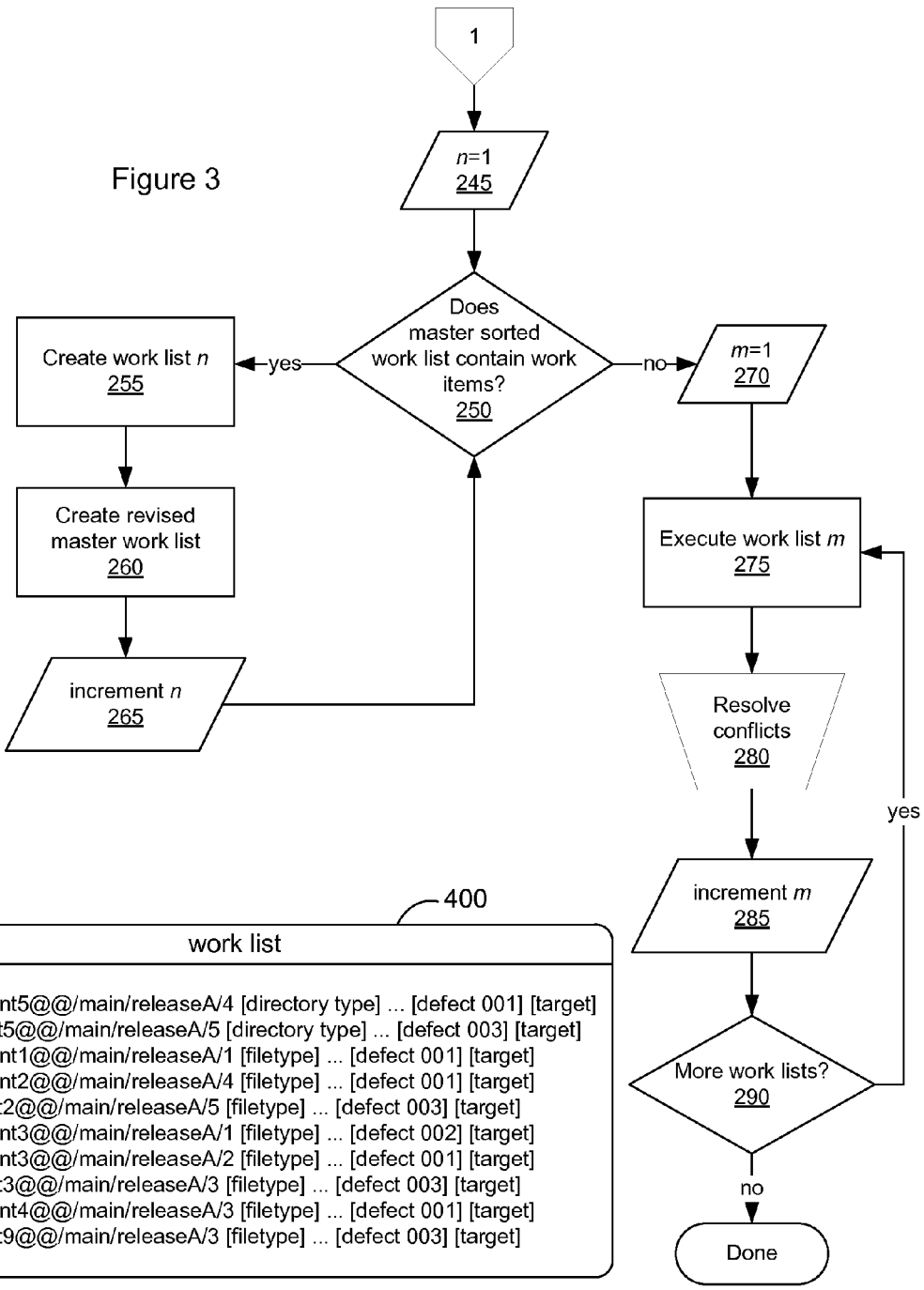
FIG. 3 is a further flowchart of the method of FIG. 2.
FIG. 9 is a schematic representation of a master sorted work list in the software development environment.
Figure 5:
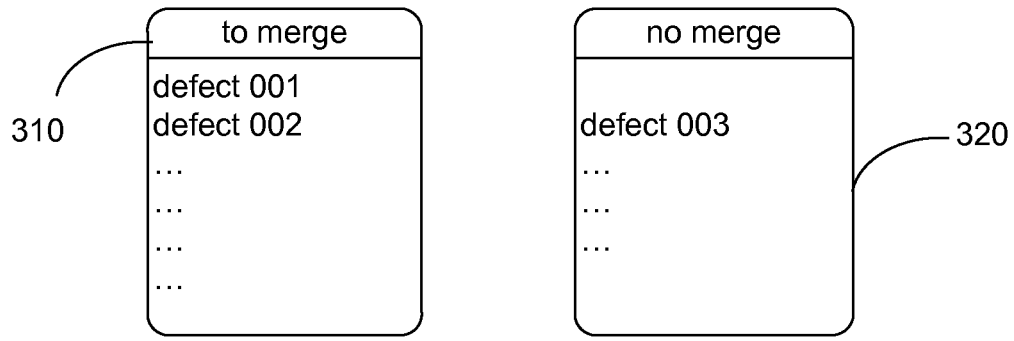
FIG. 5 is a schematic representation of defect lists in the software development environment.

When selected changed elements are to be merged, the method illustrated in FIGS. 2 and 3 is followed. As a precondition, the defects in a given software project may be coded for merging or not. This is generally indicated at block 200 in the flowchart of FIG. 2. Alternatively, block 200 may comprise the process of querying the SDE database to verify that every outstanding defect up to a given integration time $t_i$ (for example, all defects entered prior to a scheduled build date) have been appropriately marked as needing to be merged or not. If it is determined that outstanding defects entered before the integration time are not marked as "FF" or "DNFF" (or whatever other suitable indicia to indicate that the defect is to be merged or not merged), then these defects may be marked before proceeding with the automated selective merging process, or alternatively the criteria for selecting defects for the automated selective merging process may be adjusted to exclude these unmarked defects, for example by altering the integration time to exclude the unmarked defects.

Next, the SDE generates a list of defects that need to be merged at 210, and a list of defects not to be merged at 205, based on the outcome of queries of the defect database. These lists may comprise a list of defect indicia. In the example of FIG. 4, where three defects have been identified, it can be seen that the first two defects reflected in defect records 170, 180, labelled "defect 001" and "defect 002" respectively, are to be merged; the third defect in defect record 190, "defect 003", is not to be merged. An example of a defect list comprising defects to be merged 310, and of a defect list comprising defects that are not to be merged 320, is represented schematically in FIG. 5.

Figure 6:
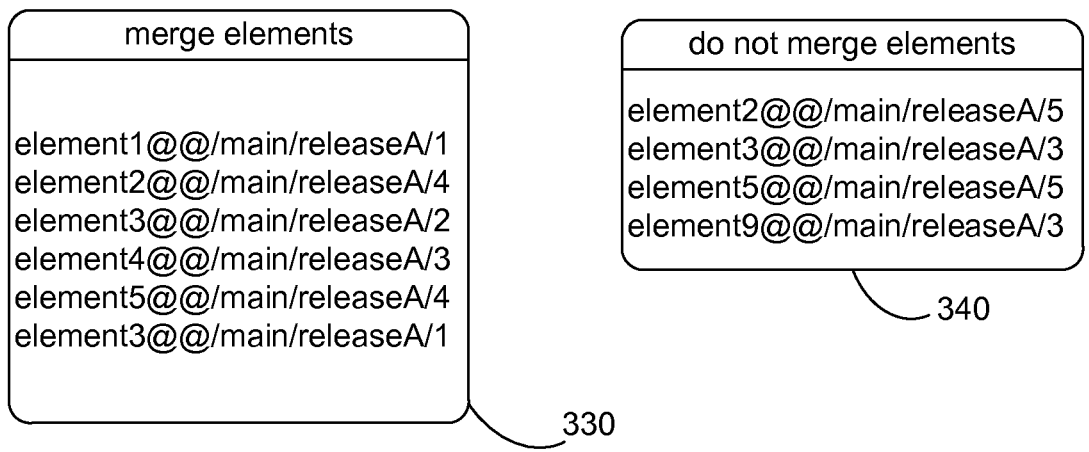
FIG. 6 is a schematic representation of element lists in the software development environment.

From each of the foregoing lists, the SDE then creates a list of element versions that are to be merged at block 220 of FIG. 2, and a list of element versions that are not to be merged at block 215, for example by querying the defect database. These element versions will correspond to the changed elements occurring after the integration time $t_i$. Exemplary schematic representations of a list of element versions that need to be merged 330 based on the defect list 310 and the defect records 170, 180, and of a list of element versions that do not need to be merged 340 based on the defect list 320 and the defect record 190, are shown in FIG. 6. The examples of FIG. 6 may be considered to be relatively short lists, since the number of defects to be merged (or not merged) in a single software project in the SDE may be large.

Figure 7:
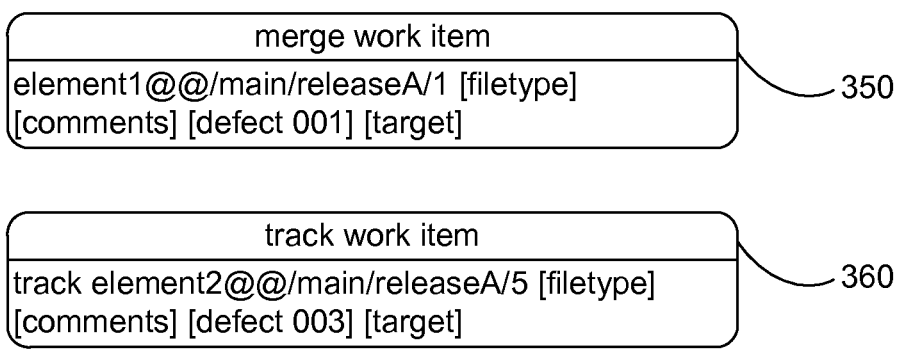
FIG. 7 is a schematic representation of work items in the software development environment.

For each changed element to be merged, the SDE then obtains any accompanying comments provided by the programmer and stored in association with the changed element at block 230 of FIG. 2, and may also obtain other information about the changed element (e.g., the element type and other information about the element that may be stored automatically by the SDE, such as the identity of the programmer or team responsible for the changed element, the time of creation, and so forth). A work item is created at block 235 of FIG. 2 based on the information thus obtained, comprising the file type, information extracted at block 230, the defect number, and the target of the forward merge operation. Similarly, at block 225 of FIG. 2, the SDE creates a work item for each changed element that is not to be merged. Exemplary schematic representations of work items are shown in FIG. 7. Work item 350 is a merge work item, for a changed element that is to be merged at a target. The target may be an identifier of a new element version on either the main branch or a subbranch associated with that changed element's history; for example, the [target] field in the merge work item 350, which describes the destination of the forward merge operation carried out on element1@@/main/releaseA/1, may be element1@@/main/releaseB/0 (i.e., a new version of element1 on the main branch). The work item 360 is a work item for a changed element that is not to be merged, but merely tracked; the work item 360 also includes a target, but the SDE will not actually forward merge the changed element with the identified target and will instead associate the changed element with the identified target.

After the work items are created, the SDE then combines the work items from blocks 225 and 235 of FIG. 2 into a single master work list at block 240, which may be sorted chronologically as shown in FIG. 9. If the SDE is capable of tracking and managing changes to directories as well as to files, then the sorted master work list may sort directories ahead of files when the master sorted work list is created. Thus, for example, if element5 is a directory whilst all other identified elements are files, a master sorted work list 400, as illustrated in FIG. 9, will list work items for element5 in chronological order in advance of other chronologically sorted work items. The chronological order may be provided by sorting the list by version, assuming that each version is numbered in chronological order; for example, element2@@/main/releaseA/4 and element5@@/main/releaseA/4 were each created before element2@@/main/releaseA/5 and element5@@/main/releaseA/5. In a further embodiment, the list may be further sorted by defect.

Figure 10:
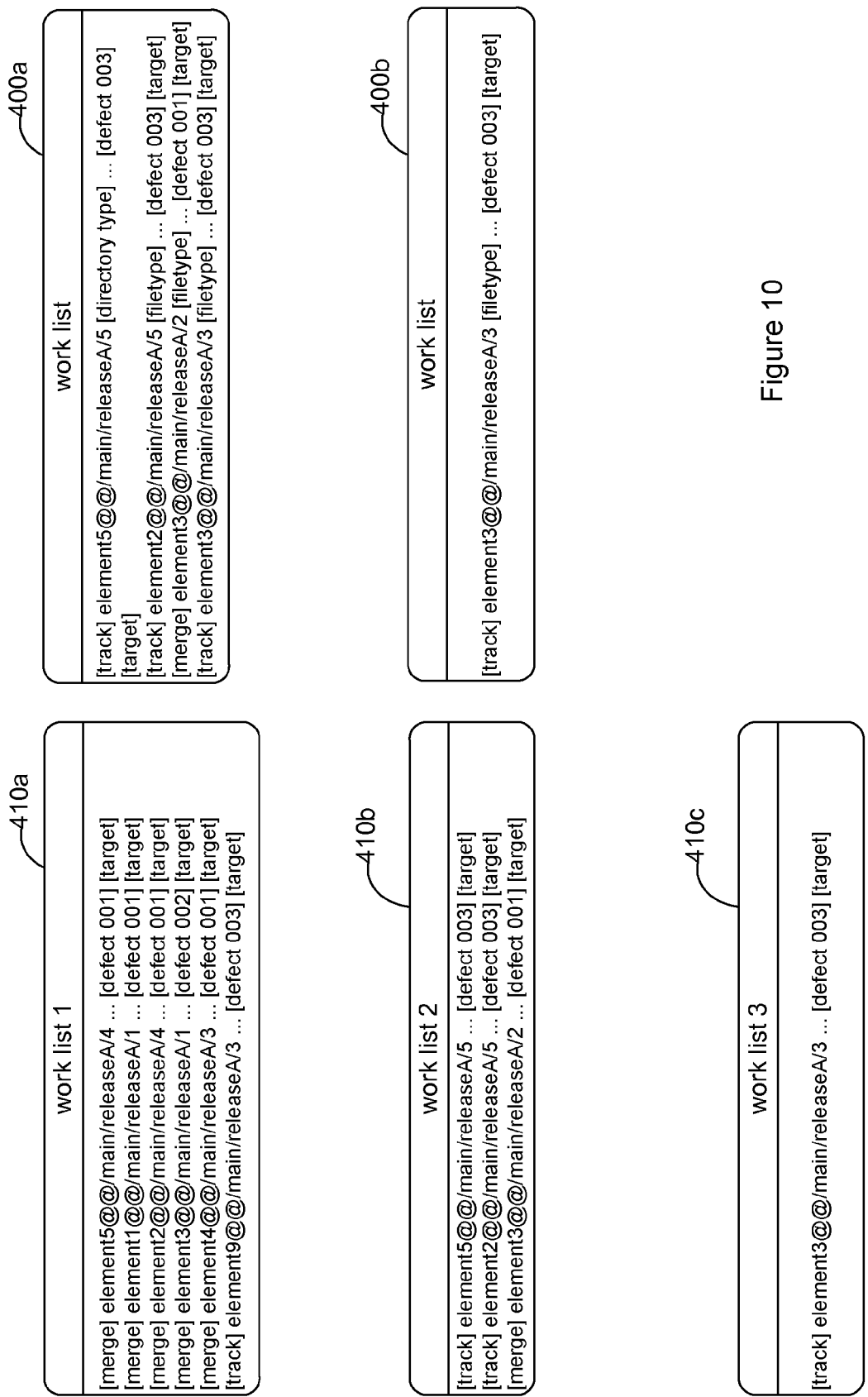
FIG. 10 is a schematic representation of sorted work lists and revised master sorted work lists in the software development environment.

Turning to FIG. 3, at least one further work list may be created from the master sorted work list. For each increment of a counter n initially set at block 245, the master sorted work list 400 is inspected by the SDE at block 250 for work items. If the master sorted work list 400 contains work items, a first $n^{th}$ sorted work list is created at block 255 by selecting the first unique element from the master list. In the example of the master sorted work list 400 of FIG. 1, the first such unique element is element5. FIG. 10 depicts a schematic representation of a first sorted work list 410a, which lists the first unique changed element for each element from the master sorted work list 400.

At block 260 of FIG. 2, a revised master sorted work list is created. The revised master sorted work list is computed as the difference between the previous master sorted work list and the $n^{th}$ sorted work list just created; thus, in the example of FIG. 10, the revised master sorted work list 400a after first sorted work list 410a is created comprises the elements of the original master sorted work list 400 without the work items identified in the first sorted work list 410a. The counter n is then incremented at block 265 of FIG. 3.

If the SDE determines at block 250 that the revised master sorted work list 400a still contains work items, then blocks 255, 260, and 265 are repeated for the next unique element in the revised master sorted work list 400a. In the revised master sorted work list 400a, there remain three unique element entries (elements5, 2, and 3); thus, the second sorted work list 410b, as depicted in FIG. 10, comprises the next set of work items relating to these three unique elements. Still a further revised master sorted work list 400b is then generated, which excludes the work items listed in the second sorted work list 410b. This process repeats as necessary; in the example illustrated by FIG. 10, after the third work list 410c, which contains the last unique work items for element3, is created, no further work items remain. Had further unique work items remained, then further revised master work lists and further sorted work lists would be generated as necessary until the SDE determines at block 250 that the revised master sorted work list does not contain any further work items.

It will be appreciated by those skilled in the art that the precise methodology of generating the n work lists may not require the explicit creation of revised master work lists. For example, a process may be executed by which each of the n work lists 410a, 410b, 410c, etc. is generated by scanning the contents of the master sorted work list 400, and selecting or pointing to elements from the master sorted work list 400, without generating or storing revised versions of the master sorted work list 400 itself. In that case, the flowchart branch 255-260-265 may terminate when the SDE determines that the end of the master sorted work list 400 has been reached.

After the SDE determines that no further work items are to be placed in one of the n work lists at 250, the process continues at block 270 of FIG. 3. A counter m is set to an initial value of 1. At block 275, work list m is executed. Thus, in the example of FIG. 10, the SDE executes the merge of element5@@/main/releaseA/4 at the target element specified in the work list 410a, and records this changed element as merged with the target element. If a merge arrow or other graphical notation may be entered in a graphical representation of the element's version history, the SDE may also execute the necessary script or store the necessary instruction so that the merge arrow or other notation is created. The SDE also executes the merge item instructions for element1@@/ main/releaseA/1, element2@@/main/releaseA/4, element3@@/main/releaseA/1, element4@@/main/releaseA/3, and the track item instruction for element9@@/main/releaseA/3. For the latter track item instruction, the SDE records the changed element as having been tracked; although the changed element is not merged with its target, the SDE may record information associated with the target element for auditing purposes indicating that the changed element has been handled. The SDE may also record, in association with the target of the track item instruction (in the corresponding example shown in FIG. 8, element9@@/main/releaseB/0), an identification of the source changed element so that it can be easily determined from an inspection of the target element that it has incorporated changes from a predecessor version. If a conflict during the execution of a work list is detected, the SDE may invoke conflict-resolving routines at block 280. These routines may comprise manual resolution of the conflict by the user. Thus, conflict resolution 280 may take place during the execution of the work list 275, and not after the execution of the work list is completed.

Next, the counter m is incremented at block 285, and the SDE determines at block 290 whether there are any further work lists to be executed. If there are further work lists, then the process of blocks 275-280-285-290 is repeated until the SDE determines that there are no further work lists at block 290, at which point the process terminates. The incremented counter m is provided so that the work lists 410a, 410b, etc. are executed in chronological order; other means for repeating blocks 275, 280 and 290 may be implemented in this process such that the work lists are executed in chronological order. In this manner, the SDE attempts the merge or tracking of a first version of each element in the sorted work list, before moving on to attempt the merge or tracking of a subsequent version of the same element in a subsequent sorted work list. By implementing the individual sorted work lists described above, a form of "batch" processing of merge and track item tasks is accomplished, and the risk of conflict arising between two instructions within a single sorted work list is minimized since each instruction within the sorted work list relates to a unique element.

The defects that were handled during the processes of FIG. 2 and FIG. 3 may be marked in the SDE has having been completed. In this manner, all changed elements that are designated for merging are automatically merged, subject to any manual conflict resolution, and changed elements resulting from defects that are not intended to be merged are not merged, but are properly documented for auditing purposes. All merging can be handled by a single person, since much of the decision-making as to whether a changed element is to be merged is automated.

FIG. 8 illustrates a series of elements referenced in the defect records 170, 180, 190. The state of the changed elements prior to the execution of the processes of FIGS. 2 and 3 is represented by the elements depicted in solid lines, and the integration time $t_i$ is indicated. The phantom lines and target elements of FIG. 8 illustrate the state of each of these elements after the processes of FIGS. 2 and 3 are completed. In each case, it is presumed that the target for each changed element is a new version of the element on the main branch; thus, in the example of element1, changed elements A/1 is merged to the target version B. In the example of element5, changed element A/4 is merged to element version B; changed element A/5, which as described above was created in response to a defect that was not to be forward fitted, is merely tracked at element version B; however, the phantom merge arrow leading from A/5 to version B indicates to the user that the changed element, although unmerged, has been tracked in version B for auditing purposes.

Figure 11:
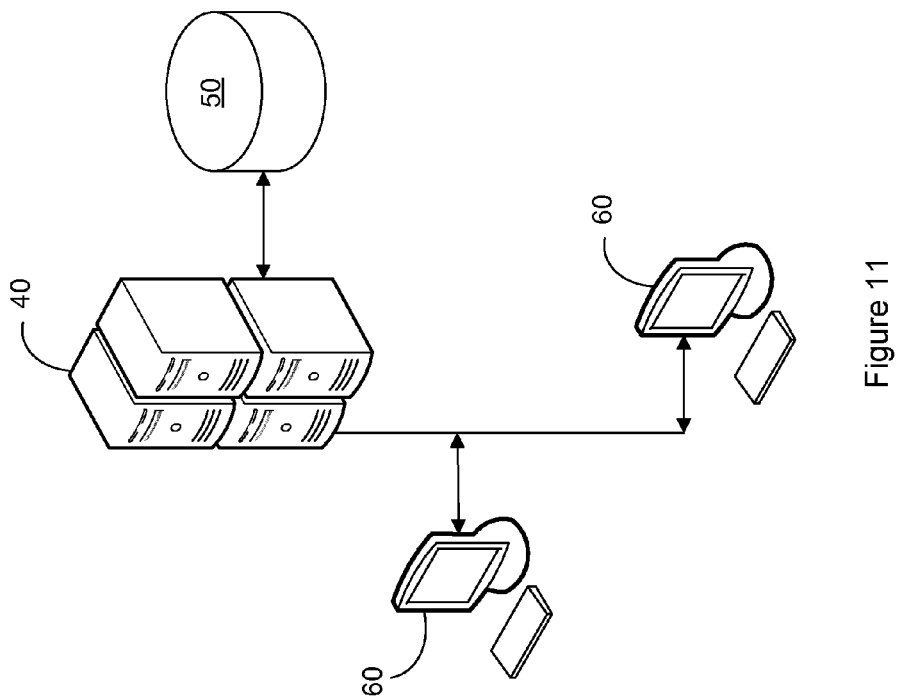
FIG. 11 is a schematic representation of a data processing system for implementing the methods of FIGS. 2 and 3.

The data stored in association with the various changed elements—the merge data or other documentation, comments, identity of the programmer or team responsible for the changed element or defect, and so forth—may be stored as metadata associated with the changed element. The SDE may comprise elements to provide all functionality described above in a single, integrated product, or alternatively aspects of the SDE described above may be provided in a plurality of software development, defect tracking, and management tools. Referring to FIG. 11, the SDE may be embodied in software executable on an application server 40 resident on a network in communication with one or more client workstations 60. The application server 40 may contain the data repository for the SDE; the data repository, or a portion thereof may be served from a database 50 resident on the application server 40 or from another server on the network.

The systems and methods disclosed herein are presented only by way of example and are not meant to limit the scope of the invention. Other variations and modifications of the systems and methods described above will be apparent to those skilled in the art and as such are considered to be within the scope of the invention, which includes all such variations and modifications as fall within the scope of the appended claims. For example, it should be understood that acts and the order of the acts in the processing described herein may be altered, modified and/or augmented, or that said acts may be carried out by software and/or hardware modules designed for such purpose, and still achieve the desired outcome.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The systems' and methods' data may be stored in one or more media. The media can be memory comprised in many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program. Media can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disc-read only memory (CDROM), compact disc-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. In a data processing system, the components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Various embodiments of the present invention having been thus described in detail by way of example, it will be apparent to those skilled in the art that variations and modifications may be made without departing from the invention. The invention includes all such variations and modifications as fall within the scope of the appended claims.

The invention claimed is:

1. A method for selectively operating on changed elements in a software development environment having a software project comprising a plurality of version-controlled software development objects and having each changed element comprising a modified version-controlled software development object, the method comprising:
   generating, for each of the changed elements associated with a defect among a set of at least one defect in the software project, a work item comprising an identifier of the changed element, an operation for the changed element, and a target for said operation;
   creating a first list having a first set of work items corresponding to changed elements that are to be merged;
   creating a second list having a second set of work items corresponding to changed elements that are not to be merged;
   generating a master work list comprising the said work items chronologically ordered by combining the first set of work items from the first list and a second set of work items from the second list; and
   for each unique version-controlled software development object associated with the changed elements of each work item in the master work list, executing all work items associated with the unique element in chronological order.

2. The method of claim 1, wherein the operation for each of the changed elements is selected for selectively merging the changed element at the target and associating the changed element with the target, the target comprising a target version-controlled software development object.

3. The method of claim 2, wherein merging the changed element at the target comprises incorporating modifications to the version-controlled software development object comprised in the changed element with another version of the version-controlled software development object at the target.

4. The method of claim 3, wherein merging further comprises storing metadata indicating a merge relationship between the changed element and the target.

5. The method of claim 2, wherein associating the changed element with the target comprises storing metadata associating the changed element with the target.

6. The method of claim 1, wherein the at least one changed element is of a type selected from a file and a directory.

7. The method of claim 1, wherein the master work list is ordered by type and ordered chronologically.

8. The method of claim 1, further comprising storing, in relation to the set of at least one defect, an indicator indicating whether the changed element associated with the respective defect is or is not to be merged into a software project.

9. The method of claim 8, wherein generating a work item for each of the said listed changed elements to be merged further comprises retrieving a comment for association with the target.

10. The method of claim 2, wherein the operation for the changed element is one of a merge operation and a track operation.

11. The method of claim 10, wherein if the operation for the changed element is the track operation, the changed element is associated with the target, but the changed element is not merged with the target.

12. A computer program product comprising a memory embodying a computer readable program, wherein the computer readable program when executed on a computer providing a software development environment having a software project comprising a plurality of version-controlled software development objects, and having each changed element comprising a modified version-controlled software development object, causes the computer to:
   generate, for each of the changed elements associated with a defect among a set of at least one defect in the software project, a work item comprising an identifier of the changed element, an operation for the changed element, and a target for said operation;
   create a first list having a first set of work items corresponding to changed elements that are to be merged;
   create a second list having a second set of work items corresponding to changed elements that are not to be merged;
   generate a master work list comprising the said work items chronologically ordered by combining the first set of work items from the first list and a second set of work items from the second list; and
   for each unique version-controlled software development object associated with the changed elements of each work item in the master work list, execute all work items associated with the unique element in chronological order.

13. The computer program product of claim 12, wherein the operation for each of the changed elements is selected for selectively merging the changed element at the target and associating the changed element with the target, the target comprising a target version-controlled software development object.

14. The computer program product of claim 12, wherein merging comprises storing metadata indicating a merge relationship between the changed element and the target, and associating the changed element with the target comprises storing metadata associating the changed element with the target.

15. The computer program product of claim 14, wherein each of the changed elements is of a type selected from a file and a directory, and wherein the master work list is ordered by type and chronologically.

16. The computer program product of claim 12, wherein the operation for the changed element is one of a merge operation and a track operation.

17. The computer program product of claim 16, wherein if the operation for the changed element is the track operation, the changed element is associated with the target, but the changed element is not merged with the target.

18. A system for selectively operating on changed elements, comprising:
a data repository for storing version-controlled software development objects associated with a software project, and for storing at least one changed element associated with a defect among a set of at least one defect in the software project comprising a modified version-controlled software development object; and
a software development environment interoperable with the data repository for recording the set of at least one defect associated with the software project, for tracking changed elements, and for merging changed elements with a corresponding version-controlled software development object;
wherein the software development environment is configured to:
generate, using a processor, for each of the changed elements associated with the respective defect among a set of at least one defect in the software project in the software project, a work item comprising an identifier of the changed element, an operation for the changed element, and a target for said operation;
create a first list having a first set of work items corresponding to changed elements that are to be merged;
create a second list having a second set of work items corresponding to changed elements that are not to be merged;
generate a master work list comprising the said work items chronologically ordered by combining the first set of work items from the first list and a second set of work items from the second list; and
for each unique version-controlled software development object associated with the changed elements of each work item in the master work list, execute all work items associated with the unique element in chronological order,
wherein the operation for each of the changed elements is selected for selectively merging the changed element at the target and associating the changed element with the target, the target comprising a target version-controlled software development object.

19. The system of claim 18, wherein the operation for the changed element is one of a merge operation and a track operation.

20. The system of claim 19, wherein if the operation for the changed element is the track operation, the changed element is associated with the target, but the changed element is not merged with the target.

21. A method for selectively operating on changed elements in a software development environment, the software development environment comprising a set of at least one defect associated with a software project, the software project comprising a plurality of version-controlled software development objects, each defect being associated with at least one changed element, each changed element comprising a modified version-controlled software development object, the method comprising:
generating, for each of the changed elements in the software project, a work item comprising an identifier of the changed element, an operation for the changed element, and a target for said operation;
generating a master work list comprising the said work items chronologically ordered; and
for each unique version-controlled software development object associated with the changed elements of each work item in the master work list, executing all work items associated with the unique element in chronological order,
wherein executing all work items associated with the unique element in chronological order for each unique version-controlled software development object comprises:
generating, from the master work list, a sorted work list comprising work items associated with the unique version-controlled software development object, wherein the work items in the sorted work list are chronologically ordered, and
generating a revised master work list comprising the differences between the master work list and the sorted work list, such that the generating of the sorted work list and the generating of the revised master work list is repeated for each unique version-controlled software development object, until the revised master work list does not contain any further work items; and
executing each sorted work list in chronological order by executing each work item comprised in the sorted work list, until all sorted work lists have been executed.

22. A method for selectively operating on changed elements in a software development environment, the software development environment comprising a set of at least one defect associated with a software project, the software project comprising a plurality of version-controlled software development objects, each defect being associated with at least one changed element, each changed element comprising a modified version-controlled software development object, the method comprising:
generating, for each of the changed elements in the software project, a work item comprising an identifier of the changed element, an operation for the changed element, and a target for said operation;
generating a master work list comprising the said work items chronologically ordered; and
for each unique version-controlled software development object associated with the changed elements of each work item in the master work list, executing all work items associated with the unique element in chronological order,
wherein generating a work item for each of the changed elements in the software project comprises:
generating a list of defects to be incorporated into the software project from the set of at least one defect;
generating, from said list of defects to be incorporated, a list of changed elements to be merged with a target in the software project;
generating a list of defects not to be incorporated into the software project from the set of at least one defect;
generating, from said list of defects comprising changed elements not to be incorporated, a list of changed elements not to be merged;
generating, from the list of changed elements to be merged into a target, a work item for each of the said listed changed elements to be merged comprising an identifier for the changed element, a merging operation identifier, and a target identifier; and generating, from the list of defects not to be merged, a work item for each of the said listed changed elements not to be merged comprising an identifier for the changed element, an associating operation identifier, and a target identifier.

23. A computer program product comprising a memory embodying a computer readable program, wherein the computer readable program when executed on a computer providing a software development environment comprising a set of at least one defect associated with a software project wherein the software project comprises a plurality of version-controlled software development objects, each defect being associated with at least one changed element, and each changed element comprising a modified version-controlled software development object, causes the computer to:

generate, for each of the changed elements in the software project, a work item comprising an identifier of the changed element, an operation for the changed element, and a target for said operation;

generate a master work list comprising the said work items chronologically ordered; and for each unique version-controlled software development object associated with the changed elements of each work item in the master work list, execute all work items associated with the unique element in chronological order, wherein when the computer readable program causes the computer to execute all work items associated with the unique element in chronological order for each unique version-controlled software development object, the computer readable program causes the computer to:

generate, from the master work list, a sorted work list comprising work items associated with the unique version-controlled software development object, wherein the work items in the sorted work list are chronologically ordered, and generate a revised master work list comprising the differences between the master work list and the sorted work list, repeat the generation of the sorted work list and the revised master work list for each unique version-controlled software development object, until the revised master work list does not contain any further work items; and execute each sorted work list in chronological order by executing each work item comprised in the sorted work list, until all sorted work lists have been executed.

24. A computer program product comprising a memory embodying a computer readable program, wherein the computer readable program when executed on a computer providing a software development environment comprising a set of at least one defect associated with a software project wherein the software project comprises a plurality of version-controlled software development objects, each defect being associated with at least one changed element, and each changed element comprising a modified version-controlled software development object, causes the computer to:

generate, for each of the changed elements in the software project, a work item comprising an identifier of the changed element, an operation for the changed element, and a target for said operation;

generate a master work list comprising the said work items chronologically ordered; and for each unique version-controlled software development object associated with the changed elements of each work item in the master work list, execute all work items associated with the unique element in chronological order, wherein when the computer readable program causes the computer to generate a work item comprising an identifier of the changed element for each of the changed elements in the software project, the computer readable program causes the computer to:

generate a list of defects to be incorporated into the software project from the set of at least one defect;

generate, from said list of defects to be incorporated, a list of changed elements to be merged with a target, the changed elements being associated with the defects thus listed;

generate, from the set of at least one defect associated with the software project, a list of defects not to be incorporated into the software project;

generate, from said list of defects not to be incorporated, a list of changed elements not to be merged, the changed elements being associated with the defects thus listed;

generate, from the list of changed elements to be merged, a work item for each of the changed elements to be merged comprising an identifier for the changed element, a merging operation identifier, and a target identifier; and generate, from the list of changed elements not to be merged, a work item for each of the changed elements not to be merged comprising an identifier for the changed element, an associating operation identifier, and a target identifier.

25. A system for selectively operating on changed elements, comprising:

a data repository for storing version-controlled software development objects associated with a software project, and for storing at least one changed element comprising a modified version-controlled software development object; and a software development environment interoperable with the data repository for recording defects associated with a software project, for tracking changed elements, and for merging changed elements with a corresponding version-controlled software development object;

wherein the software development environment is configured to:

generate, using a processor, for each of the changed elements in the software project, a work item comprising an identifier of the changed element, an operation for the changed element, and a target for said operation;

generate a master work list comprising the said work items chronologically ordered; and for each unique version-controlled software development object associated with the changed elements of each work item in the master work list, execute all work items associated with the unique element in chronological order, wherein the operation for each of the changed elements is selected for selectively merging the changed element at the target and associating the changed element with the target, the target comprising a target version-controlled software development object, wherein the software development environment is further configured to execute all work items associated with the unique element in chronological order for each unique version-controlled software development object by:

generating, from the master work list, a sorted work list comprising work items associated with the unique version-controlled software development object, wherein the work items in the sorted work list are chronologically ordered, and generating a revised master work list comprising the differences between the master work list and the sorted work list, repeating the generation of the sorted work list and the revised master work list for each unique version-controlled software development object, until the revised master work list does not contain any further work items; and executing each sorted work list in chronological order by executing each work item comprised in the sorted work list, until all sorted work lists have been executed.

26. A system for selectively operating on changed elements, comprising:

a data repository for storing version-controlled software development objects associated with a software project, and for storing at least one changed element comprising a modified version-controlled software development object; and a software development environment interoperable with the data repository for recording defects associated with a software project, for tracking changed elements, and for merging changed elements with a corresponding version-controlled software development object;

wherein the software development environment is configured to:

generate, using a processor, for each of the changed elements in the software project, a work item comprising an identifier of the changed element, an operation for the changed element, and a target for said operation;

generate a master work list comprising the said work items chronologically ordered; and for each unique version-controlled software development object associated with the changed elements of each work item in the master work list, execute all work items associated with the unique element in chronological order, wherein the operation for each of the changed elements is selected for selectively merging the changed element at the target and associating the changed element with the target, the target comprising a target version-controlled software development object, wherein the software development environment is further configured to generate a work item comprising an identifier of the changed element for each of the changed elements in the software project by:

generating a list of defects to be incorporated into the software project from the set of at least one defect;

generating, from said list of defects to be incorporated, a list of changed elements to be merged with a target, the changed elements being associated with the defects thus listed;

generating, from the set of at least one defect associated with the software project, a list of defects not to be incorporated into the software project;

generating, from said list of defects not to be incorporated, a list of changed elements not to be merged, the changed elements being associated with the defects thus listed;

generating, from the list of changed elements to be merged, a work item for each of the changed elements to be merged comprising an identifier for the changed element, a merging operation identifier, and a target identifier; and generating, from the list of changed elements not to be merged, a work item for each of the changed elements not to be merged comprising an identifier for the changed element, an associating operation identifier, and a target identifier.

* * * * *